Aug. 30, 1966
C. L. CALKINS
3,269,023
MICROMETER LEVEL
Original Filed Aug. 26, 1960
4 Sheets-Sheet 1
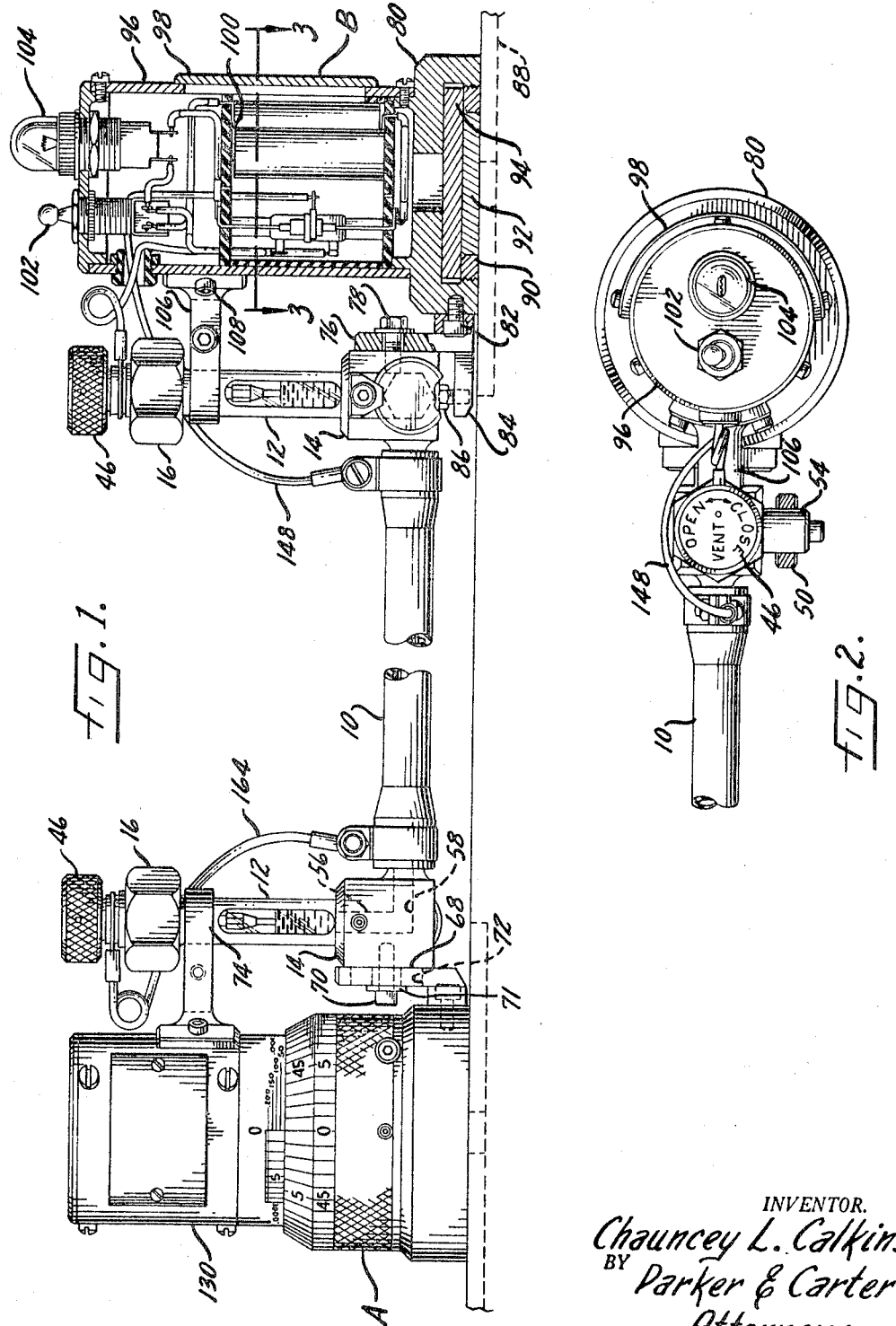
INVENTOR.
Chauncey L. Calkins,
BY Parker & Carter
Attorneys.

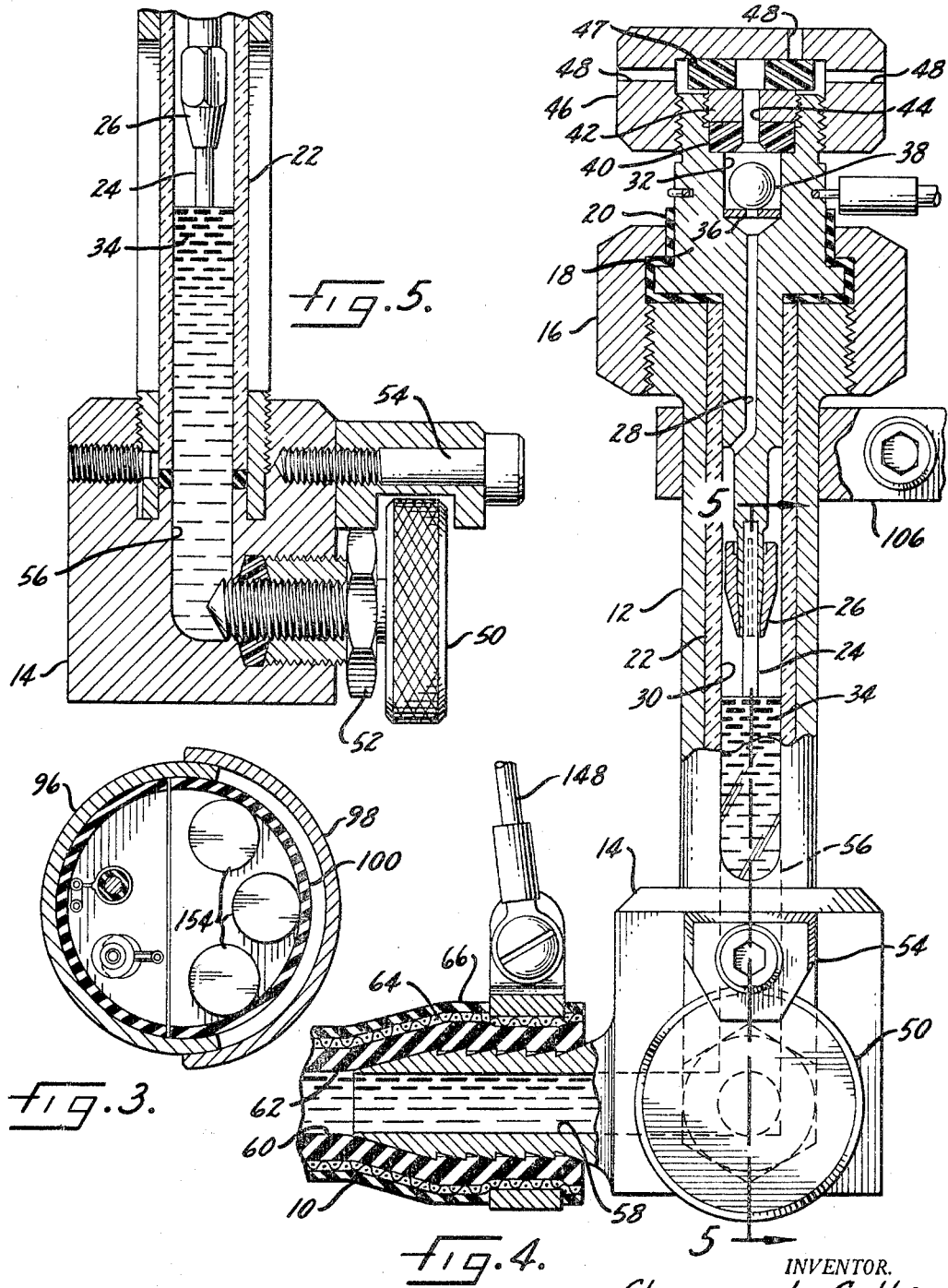

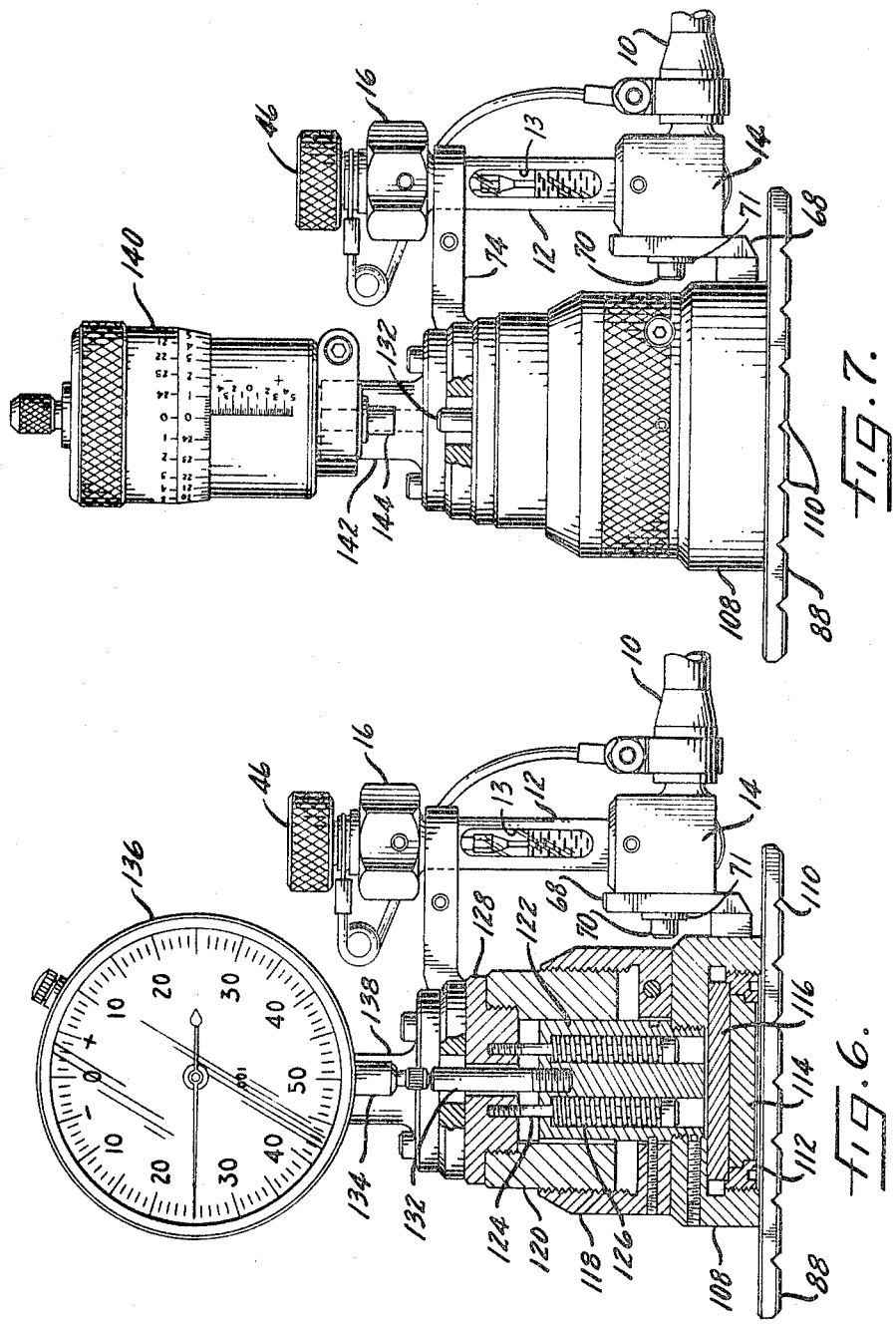

Aug. 30, 1966     C. L. CALKINS     3,269,023
MICROMETER LEVEL

Original Filed Aug. 26, 1960     4 Sheets-Sheet 4

*fig.8.*

*fig.9.*

INVENTOR.
Chauncey L. Calkins,
BY Parker & Carter
Attorneys.

United States Patent Office 3,269,023
Patented August 30, 1966

3,269,023
MICROMETER LEVEL
Chauncey L. Calkins, 222 Prospect Ave., Lake Bluff, Ill.
Continuation of application Ser. No. 57,600, Aug. 26, 1960. This application July 29, 1963, Ser. No. 298,049
5 Claims. (Cl. 33—209)

This invention relates to improvements in micrometer leveling devices, and is a continuation of my co-pending application Serial No. 57,600 filed August 26, 1960, now abandoned.

A primary purpose of this invention is to provide a micrometer leveling device having improved sensitivity and accuracy in measurement.

Another purpose is a micrometer leveling device of the type described utilizing a transistor amplifier for providing improved sensitivity in measurement.

Another purpose is a leveling device of the type described utilizing a pool of liquid mercury as a means for indicating when two spaced points are at the same level.

Another purpose is a micrometer leveling device of the type described including various improvements in construction directed towards improved sensitivity and accuracy.

Other purposes will appear in the ensuing specification, drawings and claims.

The invention is illustrated diagrammatically in the following drawings wherein:

FIGURE 1 is a side elevation, with parts in section and with parts broken for clarity, of the micrometer leveling device of this invention, FIGURE 2 is a top plan view of one of the stations of FIGURE 1, FIGURE 3 is a section along plane 3—3 of FIGURE 1, FIGURE 4 is an enlarged partial section of the mercury column housing, FIGURE 5 is a section along plane 5—5 of FIGURE 4, FIGURE 6 is a partial vertical section of a further form of the invention, FIGURE 7 is a side elevation of yet a further form of the invention, FIGURE 8 is an electrical circuit used in one form of the invention, and FIGURE 9 is an electrical circuit used in a further form of the invention.

The micrometer level of this invention is useful on machine tools such as planers, milling machines and lathe beds where large areas are to be accurately leveled, also surface plates in large sizes and extreme lengths, and rolling mill equipment.

In FIGURE 1, the micrometer level consists of two spaced platforms or stations A and B which are connected together by a flexible hose 10. When using the invention, stations A and B are positioned at spaced points which are to be leveled. The indicating dial at station A, whether it be the form of FIGURE 1, or the forms shown in FIGURE 6 or 7, indicates when the two stations are level and indicates any difference in height between the two stations.

Stations A and B, regardless of their particular form, each include a column of mercury, the two columns of mercury being a part of a larger pool of mercury in the flexible hose 10. The pool or mercury will always be at the same level at stations A and B, thus making it possible to accurately determine any difference in level between these stations. FIGURES 4 and 5 show the detail of the mercury columns. A column housing 12 may be threadedly mounted on a column base 14 and may threadedly mount a column nut 16 at the upper end of the housing. The column nut 16 is insulated from a valve housing 18 by means of insulation 20. The lower portion of the valve housing 18 extends within the column housing 12 and is separated therefrom by a glass tube 22.

Mounted on the lower end of the valve housing 18 is an electrode 24 secured thereto by a nut or the like 26. Preferably, the electrode 24 is a non-metallic composition of low electrical resistance such that the liquid electrical conductor, which may be mercury, will not stick to the electrode or amalgamate with the contact surface such as would happen if the electrode were metal. The valve housing 18 has a vent passage 28 opening into a lower chamber 30 inside of the glass tube 22, and opening into a valve chamber 32 at the upper end of the valve housing. The chamber 30 contains a column of an electrically conductive liquid, preferably mercury, indicated at 34. The column housing 12 may have an opening 13 so that the mercury and electrode may be visibly inspected through the glass tube 22.

The chamber 32 contains a retainer ring 36 and a valve ball 38 seated thereon, the valve ball providing a self-closing valve for the mercury column in the event one station is placed at too high a level above the other station or in the event the stations are tipped such that the mercury may run out. A valve seat 40, which is preferably plastic, is held in position at the upper end of the valve housing by a valve retainer 42 threadedly mounted in the valve housing. The valve seat 40 is apertured, as at 44, so that any pressure built up within the chambers 30 and 32 may be vented to the atmosphere. The valve ball 38, which is made of a material which has a lower specific gravity than mercury, and will float upon the mercury, will be forced upwardly against the valve seat 40 and close passage 44 if the mercury rises through the chamber 30, passage 28 and into the chamber 32. The column is completed by a vent cap 46 threadedly mounted on the valve housing 18 and having a plurality of vent passages 48 which may be used to vent pressure within the column to the atmosphere. A vent washer 47 is positioned on the valve retainer 42 and provides a seal between the cap 46 and the valve retainer. It should be pointed out that normally the vent cap will be open so that there is no pressure on the column of mercury. However, during shipment the vent cap should be closed to keep the mercury from running out of the column. Prior to use, the vent cap will be turned to release the vent washer so that the openings 48 are in communication with the chamber 30.

A volume control screw 50 (FIGURE 5) may be threadedly mounted in the column base 14 to control the volume of mercury within the chamber 30 or, in other words, to control the height of the mercury column 34. The control 50 is used in case the volume of mercury should change due to a large increase or decrease in temperature. A packing gland 52 may form a seal around the control screw 50, the packing gland in turn may be locked in position by a locking screw attachment 54.

The column base 14 may have a generally vertical passage 56 and a generally horizontal passage 58 which are in communication with the mercury column 34 and with the interior 60 of the hose 10. In other words, the mercury in the hose 10, along with the two columns of mercury 34, form a continuous pool of mercury. The hose may include a layer of insulation 62 which is in contact with the mercury and a metallic reinforcement 64 enclosing the insulation layer 62. Preferably, the entire flexible coupling is then covered by a suitable layer of insulation 66. It can be seen from the above description that the flexible coupling provides two complete and separate electrical circuits, one being the pool of liquid mercury, and the other being the metallic reinforcement 64. The purpose of these two electrical connections will be described hereinafter.

In the form of the invention shown in FIGURE 1, the column base 14 may be mounted on station A through the use of a column base bracket 68 and a cap screw 70, the screw 70 being mounted in a bushing 71 slideable in a slot 72 in the bracket 68. The screw 70 locks the bushing securely to the base 14. Preferably, there is a minimum amount of play between the inside surface of the bushing flange and bracket 68 and between the bracket and the base. Slot 72 permits vertical movement of the bushing, cap screw and base 14. A bracket 74 may be secured to the upper portion of the column housing and in turn is mounted on station A. The column housing and column base are mounted on station B by means of a bracket 76 which is secured to the column base 14 by means of a locking screw 78. The lower section of bracket 76 is mounted on base 80 of station B by means of a stud or the like 82. The bracket 76 has a knee 84 which extends underneath the column base 14 and which has a calibration screw 86 extending upwardly into contact with the bottom of the column base. The operation of the calibrating screw 86 will be described hereinafter.

The construction of station B will now be described. The base 80, which may be mounted on an armature 88 includes a retainer 90 threadedly mounted in the base 80 and enclosing a pole piece 92. The pole piece and the retainer mount a permanent magnet 94 which may be used to provide stability for the leveling device as the magnet 94 will firmly hold the platform or station on the particular piece of equipment to be leveled. In this connection, the armature 88 is used when the leveling device is being used on non-metallic surfaces. The armature is a large circular plate which rests on the surface to be leveled, the stations or platforms being held to the armature by the force of the magnets. Preferably, the bottom surface of the armature is grooved, as at 110, to divide the surface into a plurality of squares. A housing 96 may be mounted on the base 80 and may include an access cover 98 which opens to permit entrance into the interior of the housing to inspect and/or replace the electrical components therein. The housing 96 may be interiorly lined with insulation 100 to isolate the electrical components positioned therein. The electrical components will not be described in detail in connection with FIGURE 1, but will be described in connection with the wiring diagrams of FIGURES 8 and 9. Station B is completed by a toggle switch 102 and a light indicator 104. A bracket 106 mounted on the side of the housing by a stud 108 holds the upper portion of the column housing in position.

The interior construction of station A is illustrated by FIGURE 6, although FIGURE 6 has a different form of indicating dial mounted thereon. Station A may comprise either the form shown in FIGURE 1 or the forms shown in FIGURES 6 and 7. The construction of these three forms is generally similar with just a different indicating dial mounted thereon. A base 108 may be mounted on an armature 88. A retainer 112 is mounted within the base 108 and serves to hold a pole piece 114 in position. The pole piece and retainer mount a permanent magnet 116, similar to that shown at station B. A barrel 118 is mounted on the base 108 and in turn threadedly mounts a movable sleeve 120. A retainer 122 is positioned within the sleeve and barrel and is threadedly mounted to the base 108. The retainer 122 is keyed to the sleeve and to the barrel 118 such that rotation of the barrel moves the sleeve upward or downward. Mounted within the retainer 122 are a plurality of screws 124 which are biased downward by springs 126. The screws in turn pass outwardly from the retainer and are fixedly mounted in a sleeve plate 128 which is mounted on top of the sleeve 120. The retainer is fixed in a vertical direction and the springs and screws 126 and 124 hold or bias the sleeve downward to prevent any backlash between the sleeve and the barrel 118.

In the form of the invention shown in FIGURE 1, station A is engraved so that it functions as a micrometer dial and the calibrations on both the sleeve and the barrel indicate the height through which the sleeve may be raised or lowered. The barrel may be graduated in thousandths of an inch and the sleeve may have a vernier scale graduation in tenths of thousandths. This form of station A is completed by a cylinder 130 mounted on the sleeve plate 128 which in turn mounts the bracket 74 holding the column housing.

In the form of station A illustrated in FIGURE 6, a stud 132 is threadedly mounted in the retainer 122 and is in contact with a pressure responsive member 134 forming a part of the dial indicator 136. The dial indicator 136 may be mounted on the sleeve plate 128 by a bracket 138. As the barrel 118, which is not engraved in the form shown in FIGURE 6, is rotated, the sleeve 120 will move up and down and the pressure upon the pressure responsive member 134 will increase or decrease. The dial indicator 136 is calibrated so that the pressure on the member 134 may be read in thousandths of an inch. The bezel and dial on the dial indicator may be rotated to bring (0) in line with the indicating pointer for calibrating needs. The bezel and dial can then be locked in position with the thumb nut which is shown on the dial.

The form of station A shown in FIGURE 7 is generally the same as that shown in FIGUURE 6 except that a standard micrometer head 140 is mounted on the sleeve plate 128 by means of a bracket 142. The micrometer barrel 140 is rotated until a spindle 144 extending downwardly from the micrometer head comes in contact with stud 132 which is the same as stud 132 in FIGURE 6.

The electrical circuit which may be used with the form of the invention shown in FIGURES 1, 6 or 7 is illustrated in FIGURE 8. A transistor 146 may have its body connected by a wire 148 to the metallic reinforcement 64 forming a part of the flexible connector or hose 10. The emitter of the transistor 146 is connected by a wire 150 to an indicating device, which may either be a lamp 152, relay coil, or a buzzer as preferred. The collector of the transistor 146 is connected to the negative terminal of a battery or other source of direct current 154 by wire 156. A switch 158 is connected between the battery 154 and the indicator 152. The switch and lamp 152 are also connected through wire 160 to a resistor 162 and then to the electrode 24 of station B. At station A the electrode 24 is connected by a wire 164 to the metallic reinforcement 64.

When both electrodes 24 just contact the mercury columns 34, which indicates a level condition, current will flow in the base circuit of the transistor 146. The transistor 146 is an amplifier and any minute current flowing in the base circuit will be amplified by this device to produce a much larger current in the lamp circuit. In other words, extreme sensitivity is obtained through the use of the transistor in that a small current flowing through the mercury pool and through the electrodes, will provide sufficient current to the transistor, such that when amplified, the indicating lamp 152 will glow. In place of the transistor a vacuum tube may be used as an amplifier, however, transistors are more desirable as they have greater sensitivity and can operate on much lower currents, for example currents in the microampere range.

In the use of the invention as shown in FIGURE 1, the micrometer barrel is first set to the zero line on both the rotary and the vertical scales. Station B is then adjusted to the same precise height by the use of calibrating screw 86. Once station B is set, locking screw 78 is then tightened down. Station A and station B will be at the same height when both electrodes are just touching the mercury column. If the switch 158 is closed, the indicating lamp 152 will then glow or any device used will be energized. Thereafter, stations A and B are spaced at any points on a milling machine, planer or lathe bed or any other device to be accurately leveled, and the micrometer barrel 118 is rotated until the column housing, and hence the electrode at station A has been moved to just contact the mercury column. The distance through which station A has been moved either up or down can then be read on the dial indicator at station A. This reading is the difference in height between stations A and B and thus the difference in height between the points being leveled. The transistor circuit used in connection with the form of the invention shown in FIGURE 1 is ultra-sensitive and gives a precise indication when contact is made or broken between the mercury column and an electrode. For example, when the resistance 162 is between 7,000 and 10,000 ohms and with a battery voltage of about four volts there will be a current of approximately 572 microamperes flowing through the mercury column. This same small current in the mercury column will give a current in the lamp circuit of roughly a half an ampere.

The devices shown in FIGURES 6 and 7 may replace station A as shown in FIGURE 1 and the same type of operation is followed. The indicators are first calibrated by placing both stations A and B on a level surface. Thereafter, any difference in height between these two stations may be read on either the dial indicator or FIGURE 6 which is calibrated in one-thousandths of an inch or on the micrometer head barrel of FIGURE 7. In using the micrometer head of FIGURE 7, when a level condition is attained at stations A and B, the micrometer head barrel is rotated until spindle 144 is in contact with stud 132. Thereafter, when stations A and B are placed on a surface which is not level, the micrometer head barrel is again rotated so that spindle 144 contacts stud 132. The difference between this reading and the first reading indicates the difference in level between stations A and B. It is also possible to set the micrometer dial at zero and then move station B by means of calibrating screw 84 until there is a level condition. Thereafter, any difference in level can be read directly on the dial of station A.

If the surface used for the initial calibration is not level within a high degree of accuracy, the calibration of both stations A and B can be checked by reversing their positions on the surface and checking the readings one against the other.

A further form of the invention may be utilized with the circuit shown in FIGURE 9. In this case, stations A and B are identical except for the switch 166 which may be placed on either station A or B, but preferably is at station B. Both stations A and B are similar to the form of station A shown in FIGURE 1. In other words, both stations A and B have micrometer dials or micrometer barrels so that the height of each station may be adjusted. Stations A and B each have an indicating lamp 168 which is connected to the electrodes 24 and to a source of direct current 170. The sources of direct current are in turn connected to the metal reinforcement on the flexible hose 10. In this case, when switch 166 is closed, the two indicating lamps 168, which are in series, will both come on when there is a level condition or when the electrodes 24 are just in contact with the mercury columns 34. Both stations A and B have an indicating lamp and these lamps will simultaneously light when stations A and B are level. By providing both stations A and B with a micrometer barrel the leveling device has further flexibility in that either one or the other of these two stations may be raised or lowered to give an indication of the difference in height therebetween.

Whereas the preferred form of the invention has been shown and described herein, it should be realized that there are many modifications, substitutions and alterations thereto within the scope of the following claims.

I claim:
1. A micrometer level including a pair of spaced platforms, a housing mounted on each of said platforms, each of said housings including a chamber containing a column of liquid mercury, each housing mounting a non-metallic electrode positioned for contact with the column of mercury in that housing, an electrical connection between said columns of mercury including a flexible hose containing a pool of liquid mercury, said hose having an electrically conductive reinforcement which is electrically insulated from said mercury, one of said electrodes being electrically connected to said electrically conductive reinforcement, the other electrode being connected through a high resistance to an indicator, a transistor, the emitter and collector of said transistor being in series connection with said indicator and a D.C. voltage source, the body of said transistor being connected to said electrically conductive reinforcement, said transistor being effective to amplify minute currents flowing through the current path formed by the mercury and electrically conductive reinforcements when both electrodes are in contact with the mercury, to provide sufficient current to operate said indicator.

2. The structure of claim 1 further characterized in that said electrodes are generally cylindrical and are formed of a material having low electrical resistance.

3. The structure of claim 1 further characterized in that each housing includes a housing closing valve member mounting the electrodes at its lower end, and a vent passage in said valve member, above the electrode.

4. The structure of claim 3 further characterized by and including means for electrically insulating said housing closing valve member from said housing.

5. The structure of claim 3 further characterized by a self-closing valve mounted in each housing for closing the vent passage when the mercury reaches a predetermined level, said self-closing valve including a chamber in said housing closing valve member, and a ball valve in said chamber.

References Cited by the Examiner

UNITED STATES PATENTS

| | | | |
|---|---|---|---|
| 2,429,923 | 10/1947 | Cavicchi | 33—170 X |
| 2,438,758 | 3/1948 | Leach | 33—209 |
| 2,532,883 | 12/1950 | Bennett et al. | 33—209 |
| 2,535,791 | 12/1950 | Fluke | 33—207 |
| 2,568,575 | 9/1951 | Wickman | 33—76 |
| 2,641,213 | 6/1953 | Bolin | 33—204.62 |
| 2,804,692 | 9/1957 | Karstens | 33—209 |

LEONARD FORMAN, *Primary Examiner.*